Dec. 28, 1965 H. A. SCHWARTZ 3,226,048

ENDLESS MAGNETIC TAPE CARTRIDGE

Filed Jan. 30, 1961 2 Sheets-Sheet 1

INVENTOR.
HENRY A. SCHWARTZ
BY
J. B. Felshin
ATTORNEY.

Dec. 28, 1965 H. A. SCHWARTZ 3,226,048

ENDLESS MAGNETIC TAPE CARTRIDGE

Filed Jan. 30, 1961 2 Sheets-Sheet 2

INVENTOR.
HENRY A. SCHWARTZ

BY

J. B. Felshin
ATTORNEY.

United States Patent Office 3,226,048

Patented Dec. 28, 1965

3,226,048

ENDLESS MAGNETIC TAPE CARTRIDGE

Henry A. Schwartz, Valley Stream, N.Y., assignor, by mesne assignments, to Viking of Minneapolis, Inc., Minneapolis, Minn., a corporation of Minnesota Filed Jan. 30, 1961, Ser. No. 85,725
4 Claims. (Cl. 242—55.19)

This invention relates to endless magnetic tape cartridges, and the like devices.

Endless magnetic tape cartridges, as heretofore constructed, included a box comprising a case and a top cover for the case, a tape reel rotatably mounted on the bottom of the case and having a hub on which the coil of tape winds and unwinds, and a flanged shroud in the box and over the reel, enclosing the coil. The tape entered the shroud through a slot or opening in the flange of the shroud to wind onto the outside of the coil, and unwound from the inside of the coil at the hub, and passed out through an opening in the shroud. The hub, as heretofore constructed had an annular flange of circular outer edge, located beneath the coil.

Difficulty has been experienced with such cartridges as heretofore constructed because the tape would sometimes move beneath the bottom plate of the reel or catch at the entrance slot in the flange of the shroud, where the tape begins to rewind on the coil. The tape would also sometimes catch at the opening in the shroud where the tape unwinds from the inside of the coil. The circular flange on the hub would sometimes catch windings of the coil of tape and hence bind the tape and prevent the continuous movement of the tape.

It is hence an object of this invention to provide a highly improved cartridge of the character described, having means to obviate the above mentioned difficulties.

Another object of this invention is to provide a durable cartridge of the character described which shall be relatively inexpensive to manufacture, which shall be smooth and positive in operation, which shall not get out of order, and in which the tape will not bind or catch, and which shall be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

In the accompanying drawings in which is shown an illustrative embodiment of this invention, FIG. 1 is a top plan view of a cartridge embodying the invention, with parts broken away and in cross-section;

Figure 1:
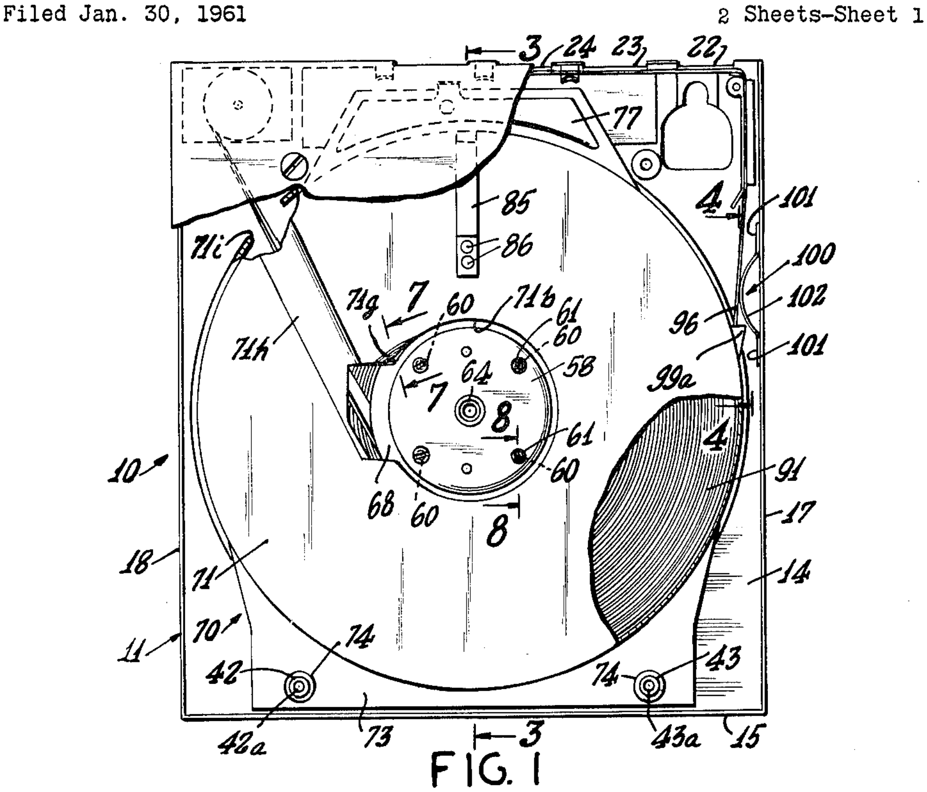
Figure 2:
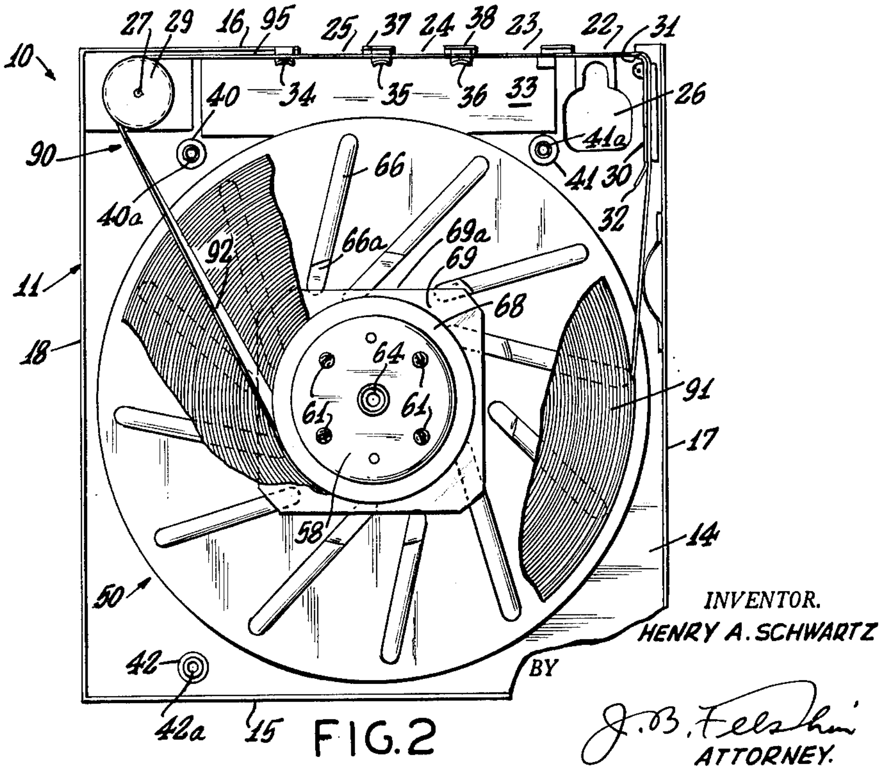
FIG. 2 is a view similar to FIG. 1 with the cover removed and with parts broken away.
Figures 3, 8:
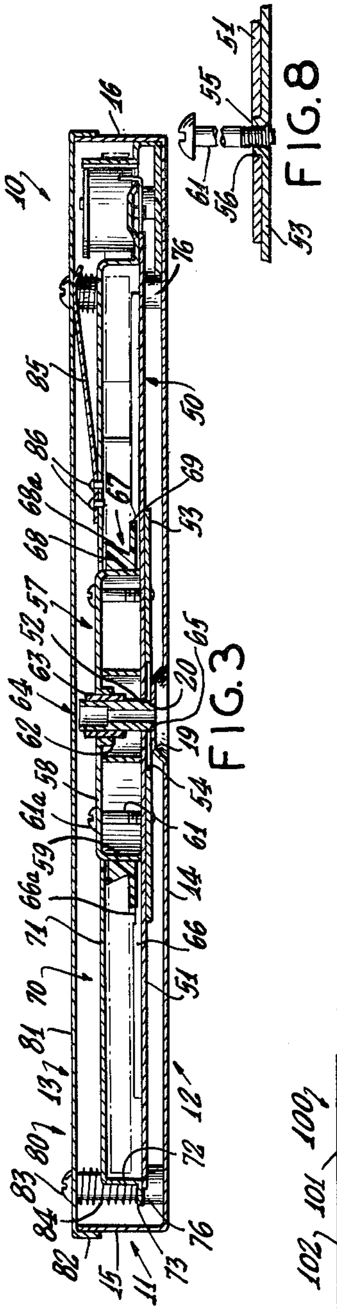
FIG. 3 is an enlarged cross-sectional view taken on line 3—3 of FIG. 1.
FIG. 8 is a cross-sectional view taken on line 8—8 of FIG. 1.
Figure 6:
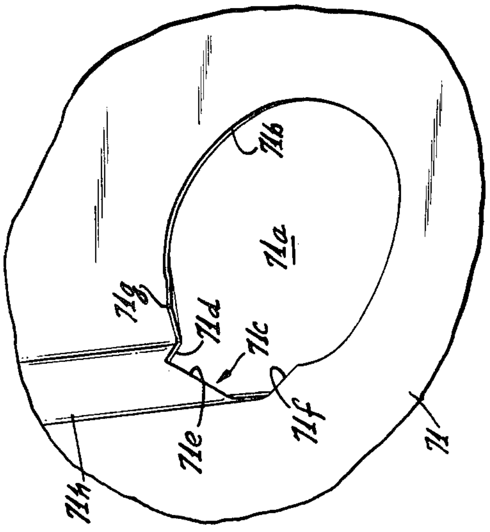
FIG. 6 is a partial, perspective view of the top wall of the shroud showing the center hole and notch where the tape unwinds from the inside of the coil.
Figure 5:
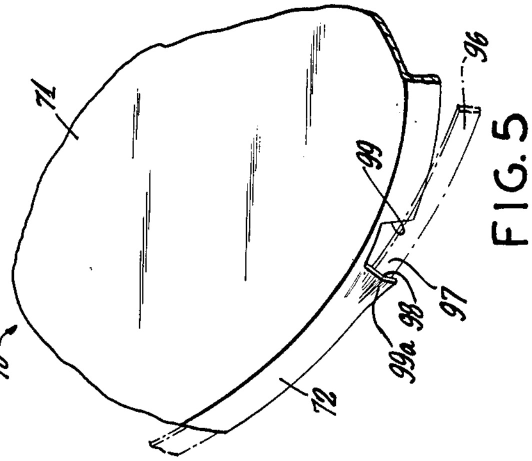
FIG. 5 is a partial perspective view of the shroud and showing the tape entering a slot in the flange of the shroud.
Figure 4:
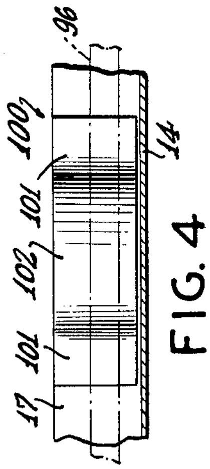
FIG. 4 is a cross-sectional view taken on line 4—4 of FIG. 1.
Figure 7:
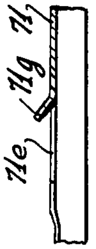
FIG. 7 is a cross-sectional view taken on line 7—7 of FIG. 1.

Referring now in detail to the drawing, 10 designates an endless magnetic tape cartridge embodying the invention. Said cartridge comprises a rectangular box 11 having a case 12 and a cover 13 for the case. The case 12 has a bottom wall 14, a front wall 15, a rear wall 16 and side walls 17 and 18. At the center of the bottom wall is an upwardly recessed annular hub 19 formed with a central bearing opening 20. Walls 15, 16, 17, 18 are of the same height and extend upwardly.

Rear wall 16 has four spaced notches or cut away portions 22, 23, 24, 25. Notch 22 extends to wall 17. Bottom wall 14 is formed with an opening 26 in one corner, adjacent notch 22. Adjacent the corner of bottom wall 14 at junction of walls 16 and 18 is a post 27 supporting a wheel or roller 29. Attached to top of wall 14, near wall 17 and between opening 26 and said wall, is an upstanding guide flange 30 parallel to said wall. Flange 30 has a curved offset 31 at one end, parallel to wall 16, and an offset 32 at its other end, inclined away from wall 17.

Also attached to the top of bottom wall 14, as by welding, is a plate 33 formed with upstanding, transversely curved guides 34, 35, 36 spaced close to wall 16. One guide 34 is disposed close to notch 25; one guide 35 is disposed inside of portion 37 of wall 16 located between notches 25, 24, and one guide 36 is disposed inside of portion 38 of wall 16 located between notches 24, 23.

Fixed to the bottom wall 14 are a pair of spaced posts 40, 41 having internal blind threaded openings ***40a*, *41a*, respectively. Said posts 40, 41 are located near wall 16. There is also fixed to the bottom wall 14, a second pair of posts 42, 43, near wall 15 and also formed with blind threaded openings *42a*, *43a***, respectively.

Rotatably mounted on the bottom wall 14 is a tape reel 50. Said reel 50 comprises a circular plate 51 formed with a central opening 52. At the underside of plate 51 is a ring disc 53 having a central opening 54 concentric with but larger than opening 52. Disc 53 has four internally threaded tubular flanges 55 extending upwardly through registering openings 56 in plate 51. On the upper side of plate 51 is a reel hub member 57 comprising a circular top wall 58 having a downwardly extending annular flange 59 the lower edge of which contacts plate 51. Wall 58 has four holes 60 aligned with openings 56 and receive screws 61, the lower ends of the shanks of which, are screwed to threaded flanges 55. The heads *61a* of screws 61 contact the upper side of top wall 58. Top wall 58 has a central, downwardly extending axial tubular flange 62 in which is fixed a tubular bushing 63. Mounted on the bottom wall 14 is a central tubular axle 64 having a lower reduced end 65 received in hole 20, and an upper portion passing through central opening 52 in plate 51 and through the bushing 63.

Plate 51 may be formed with a series of ridges 66 in its upper surface, substantially tangent to hub flange 59. The inner ends of the ridges 66 may be flattened or depressed as at *66a*. Fixed on the hub flange 59 is a hub ring 67 which may be made of plastic, and it comprises an annular portion 68 and a bottom flat portion 69. Portion 68 may have a downwardly converging outer annular surface *68a*. Portion 69 rests on the flattened inner ends 66*a* of the ridges 66, and is substantially square in shape, with corners cut. Thus, portion 69 has straight side edges 69*a*. It is non-circular, and does not have a circular outer edge. The reason for this will be explained hereinafter.

Fitted over the reel 50 is a shroud or reel cover 70. Said shroud has a top circular wall 71 from which extends downwardly, a skirt or flange 72. Posts 40, 41, 42, 43 are disposed beyond reel 50 and flange 72. The outer diameter of flange 72 is substantially the same as outer diameter of plate 51.

Extending from the lower end of flange 72 adjacent front wall 15, is a flat apron portion 73 having holes 74 receiving posts 42, 43 and resting on enlarged shoulder 76 at the lower ends of said posts. Extending from the lower ends of flange 72, is a second apron portion 77, opposite to apron 73, extending toward wall 16. Top wall 71 has a central opening 71*a* having a circular inner edge 71*b* from one side of which extends a notch 71*c* (toward wall 18). Notch 71*c* has a rear edge 71*d*, a side edge 71*e*, and a front edge 71*f*. At the junction of edges 71*d*, 71*b* is a corner portion 71*g* which is bent upwardly for the purpose hereinafter appearing. Wall 71 has an upwardly pressed portion 71*h* extending from notch 71*c* toward wheel 29.

Fitted over the case 12 is a rectangular cover 80 having a top wall 81 and a flange 82. Screws 83 pass through suitable openings in the top wall 81 and are screwed into the threaded openings in posts 40, 41, 42, 43 to fix the cover to the case. Coil compression springs 84 are received on posts 42, 43 between the apron 73 and the top wall of the cover, to resiliently hold down the shroud. A leaf spring 85 may also be attached as by rivets 86 to the top wall of the shroud and it has a free end which presses against the underside of top wall 81 of the cover 80 to resiliently depress the shroud.

The endless magnetic tape 90 comprises a coil portion 91 on the reel 50, surrounding the hub ring 68, and resting on plate 69 at its inner end, and on ridges 66 of plate 51, at its outer end.

The tape unwinds from the inside of the coil portion 91, as at 92, and passes up from the inside of the coil at notch 71*c* to the top of the coil and beneath upwardly recessed portion 71*h* out of the shroud through a slot 71*i* in the flange 72, and around guide wheel or roller 29. The tape passes from roller 29, as at 95, between wall 16 and guides 34, 35, 36 and around guide 30. The tape then passes, as at 96 through a slot 97 in flange 72 of the shroud to the inside of the shroud, and then becomes the outer winding of coil portion 91.

Slot 97 has a front edge 98 and a rear edge 99. The corner 99*a* formed by edge 98 and the lower edge of flange 72, is bent to incline outwardly for the purpose hereinafter appearing.

Attached to the inner side of wall 17 of the case, just rearwardly of the entrance slot 97, is a guide member 100 having flat ends 101 welded or otherwise fixed to said side wall and interconnected by a curved portion 102 located just rearwardly of corner portion 99*a*.

Any suitable means may be provided to pass up through hole 26, and press a portion of tape 90 passing said hole through slot 22 and against a capstan on a recorder—playback instrument such as shown for example in Patent No. 2,876,005, thereby causing the tape to move, for winding the tape continuously to the outside of the coil 91 and unwinding the tape from the inside of the coil, and causing the tape to pass a transducer head (not shown) located near slot 23, also as illustrated in said patent.

The cartridge may be removably mounted on a recorder-play-back instrument in the manner shown in said Patent No. 2,876,005. The playback instrument is provided with tapered fingers which pass through slots 24, 25 and beneath apron 77 to lift the shroud off the tape, upon mounting said cartridge on said instrument, against pressure of springs 84, 85 to free the reel for rotation.

The guide 100 keeps the tape in position to enter the slot 97 and the tape is prevented from working itself under plate 51. By bending out the corner portion 99*a*, the tape is prevented from wrapping around edge 98. In prior cartridges that did not employ guide 100 and did not bend out corner 99, the tape had a tendency to work its way under the bottom plate of the reel, and around an edge of slot where the tape entered the shroud. These difficulties have been obviated with the present improved construction.

Also in prior constructions in which the corner 71*g* was not upturned, the tape unwinding from the inside of the coil had a tendency to wrap around an edge of the notch. This is also prevented by the present construction since if the tape moves up it will still not engage the edge 71*d* which inclines upwardly.

Also, in prior constructions, the plastic hub 68 was made with a circular bottom flange overlying the metal bottom plate of the reel. With such construction, the windings of the coil of tape, gradually descreasing in diameter had a tendency to catch on the outer circular periphery of such flange, thereby preventing the proper feed of the tape. By making such flange square or non-circular, no such binding occurs, as the corners of such plate slide under the windings of the coil.

Thus, difficulties with prior constructions which made them inefficient, faulty and unreliable, have been cured with the present improvements, resulting in a smoothly operating construction.

It will thus be seen that there is provided an apparatus in which the several objects of this invention are achieved and which is well adapted to meet the conditions of practical use.

As possible embodiments might be made of the above invention, and as various changes might be made in the embodiment above set forth, it is to be understood that all matter herein set forth or shown in the accompanying drawings is to be interpreted as illustrative and not in a limiting sense. I claim:

1. An endless magnetic tape cartridge comprising a case having a bottom wall and upstanding front, rear and side walls; a cover for the case fitted thereover; a reel rotatably mounted on said bottom wall and provided with a rotatable hub ring and a rotatable bottom plate, said hub ring and bottom plate being rotatable independently of each other; a radial flange extending from said hub ring and rotatable therewith, said flange covering a portion of said rotatable bottom plate and characterized by an outer edge of varying radial distance from the center of the hub ring; an endless magnetic tape comprising a coil portion on the reel and around said hub ring and covering said flange portion and at least part of said rotatable bottom plate; and means to retain said coil of endless tape on said reel.

2. The combination of claim 1 wherein said flange is of polygonal configuration.

3. An endless magnetic tape cartridge comprising:
a box;
a reel rotatably mounted in said box;
a hub ring mounted on said reel and adapted to rotate independently thereof;
a flange radially extending from said hub ring and adapted to rotate therewith, wherein said flange is characterized by an outer edge of varying radial distance from the center of the hub ring.

4. An endless magnetic tape cartridge comprising:
a box;
a reel rotatably mounted in the box, said reel comprising a rotary plate having a central hub;
means to retain tape on said reel said means overlying said reel; and
a hub ring rotatably mounted on said hub and having a non-circular bottom flange overlying a portion of said plate.

References Cited by the Examiner

UNITED STATES PATENTS

| | | | |
|---|---|---|---|
| 1,144,693 | 6/1915 | Delaney | 242—55.18 |
| 2,177,505 | 10/1939 | Schalie | 242—55.19 |
| 2,278,367 | 3/1942 | Freimann et al. | 242—55.21 X |
| 2,281,328 | 8/1942 | Shapiro | 242—55.19 |
| 2,443,708 | 6/1948 | Links | 242—55.19 X |
| 2,778,636 | 1/1957 | Eash | 242—55.19 |
| 2,778,880 | 1/1957 | Eash | 242—55.19 X |
| 2,837,332 | 6/1958 | Busch | 242—55.19 |
| 2,921,787 | 1/1960 | Cousino | 242—55.19 |
| 2,951,654 | 9/1960 | Steelman | 242—55.19 X |

OTHER REFERENCES

Roggentin: German application 1,031,633, printed June 4, 1958, (KL. 57*a*–49), 2 pp. spec., 1 sht. dwg.

MERVIN STEIN, *Primary Examiner.*

JOSEPH P. STRIZAK, RUSSELL C. MADER, *Examiners.*